US008865842B2

(12) United States Patent
Krebs et al.

(10) Patent No.: US 8,865,842 B2
(45) Date of Patent: Oct. 21, 2014

(54) POLYURETHANE HOT-MELT ADHESIVE WITH REDUCED VISCOSITY

(71) Applicant: Henkel AG & Co. KGaA, Duesseldorf (DE)

(72) Inventors: Michael Krebs, Hilden (DE); Uwe Franken, Dormagen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/796,251

(22) Filed: Mar. 12, 2013

(65) Prior Publication Data

US 2013/0190461 A1    Jul. 25, 2013

(30) Foreign Application Priority Data

Oct. 1, 2010    (DE) .......................... 10 2010 041 855

(51) Int. Cl.

| | | |
|---|---|---|
| C08F 20/00 | (2006.01) | |
| C09J 175/04 | (2006.01) | |
| C08G 18/71 | (2006.01) | |
| C08G 18/10 | (2006.01) | |
| C09J 175/06 | (2006.01) | |
| C08G 18/42 | (2006.01) | |
| C08G 18/76 | (2006.01) | |

(52) U.S. Cl.
CPC ............. *C09J 175/06* (2013.01); *C09J 175/04* (2013.01); *C08G 18/71* (2013.01); *C08G 2170/20* (2013.01); *C08G 18/10* (2013.01); *C08G 18/4238* (2013.01); *C08G 18/7671* (2013.01)
USPC .................. 525/440.01; 525/408; 525/440.11; 525/452; 525/453; 525/454; 525/460

(58) Field of Classification Search
USPC ............... 525/408, 440.01, 440.11, 452, 453, 525/454, 460
See application file for complete search history.

(56) References Cited

U.S. PATENT DOCUMENTS

| | | | |
|---|---|---|---|
| 5,162,457 | A | 11/1992 | Hansel et al. |
| 5,441,808 | A | 8/1995 | Anderson et al. |
| 2007/0251629 | A1 | 11/2007 | Rosenberg et al. |

FOREIGN PATENT DOCUMENTS

| | | |
|---|---|---|
| DE | 4035230 | 5/1992 |
| EP | 0107097 | 5/1984 |
| EP | 0484761 | 5/1992 |
| WO | 9115530 | 10/1991 |
| WO | 0146330 | 6/2001 |
| WO | 02079292 | 10/2002 |

OTHER PUBLICATIONS

International Search Report issued in connection with International Patent Application No. PCT/EP2011/066094 mailed on Dec. 20, 2011.
EN ISO 2555.

*Primary Examiner* — Robert Jones, Jr.
(74) *Attorney, Agent, or Firm* — James E. Piotrowski

(57) ABSTRACT

A reactive melt adhesive containing 30 to 70% of at least one prepolymer having at least two isocyanate groups having a molecular weight below 6000 g/mol, manufactured from polyether polyols and/or polyester polyols reacted with a molar excess of diisocyanates, the prepolymer containing less than 1% monomeric diisocyanate; 30 to 70 wt % of a thermoplastic polyester having a number-average molecular weight ($M_N$) below 6000 g/mol, which comprises fewer than 1.4 groups reactive with NCO; and up to 30 wt % additives from the group of the catalysts, resins, plasticizers, fillers, pigments, stabilizers, or adhesion promoters.

19 Claims, No Drawings

POLYURETHANE HOT-MELT ADHESIVE WITH REDUCED VISCOSITY

The invention relates to crosslinking polyurethane adhesives having good initial adhesive strength and low application viscosity, which additionally contain non-crosslinking polyesters.

Melt adhesives are commonly known. They can be nonreactive thermoplastic adhesives; reactive adhesives are also known. They are often systems that crosslink via NCO groups. It is known that with a higher application viscosity, an improved initial strength of the bond can be obtained. If the viscosity is lowered, for example by adding plasticizers, cohesion is generally worsened. If the application temperature is raised, the adhesive and substrate experience greater thermal stress. The energy expenditure is also higher. Because these systems are reactive, the impact of monomeric diisocyanates is critical in the context of higher-temperature processing. If the molecular weight is increased by reaction with chain-lengthening substances, the initial strength of the adhesive bond rises but so does the viscosity. It is, however, a desirable goal to obtain low viscosity and a low processing temperature.

WO 91/15530 describes a melt adhesive that contains as a constituent an NCO-group-containing prepolymer as well as a polyether-polyester that comprises no NCO groups. The prepolymer is manufactured in usual fashion, and it is therefore known that these prepolymers contain a significant proportion of monomeric isocyanates. The block polyether-polyesters are described as reaction products of diols and dicarboxylic acids. A decrease in functional terminal groups is not described.

WO 01/46330 describes melt adhesives that encompass a reactive polyurethane prepolymer as well as a further prepolymer that is made up of polyether-polyester polyols, the latter having been completely reacted with an excess of diisocyanates to yield NCO prepolymers.

DE 4035280 describes melt adhesives that contain more than 70% prepolymers having NCO groups based on polyester diols, as well as up to 30% polyesters that comprise only up to 0.5 active hydrogen atoms per molecule.

The adhesives described in the existing art have a variety of disadvantages. As a result of the reaction with an excess of monomeric isocyanates, the latter are still contained in the adhesive and advantageously lower the viscosity. It is known, however, that the monomers transition into the gas phase upon processing, so that problems with occupational safety arise. Such monomers therefore need to be decreased. In addition, a reaction of the reactive groups of polyfunctional polymers with the prepolymers causes an increase in molecular weight and thus an elevation in viscosity. This then results in less-favorable processing of the adhesives.

An object of the present invention is therefore to make available a melt adhesive that can be utilized in low-monomer form, but nevertheless exhibits a low application viscosity. The adhesive is furthermore intended to ensure a rapid buildup of adhesion upon bonding.

The object is achieved by a reactive melt adhesive that contains 30 to less than 70 wt % of at least one prepolymer having at least two isocyanate groups having a molecular weight below 6000 g/mol, manufactured from polyether polyols and/or polyester polyols reacted with a molar excess of diisocyanates, where the prepolymer contains less than 1% monomeric diisocyanate, and more than 30 up to 70 wt % of a thermoplastic polyester having a number-average molecular weight ($M_N$) below 6000 g/mol that comprises fewer than 1.4 groups reactive with NCO, as well as optionally up to 30 wt % additives from the group of the catalysts, resins, plasticizers, further polymers, fillers, pigments, stabilizers, or adhesion promoters.

The prepolymers that have isocyanate groups and are suitable according to the present invention can be manufactured using methods known per se, by reacting polyols with an excess of di- and/or triisocyanates. The formation of undesired high-molecular-weight or branched byproducts can be reduced by way of the quantity of isocyanates. In an embodiment, it is thereby possible to produce prepolymers that have a polyol backbone and terminal reactive NCO groups.

A plurality of polyfunctional alcohols are suitable in the context of the invention for synthesizing the prepolymers. They are intended to comprise two to 10, in particular two to three OH groups per molecule. The compounds having multiple OH groups can be ones that carry terminal OH groups, or they can be compounds that comprise OH groups distributed laterally along the chain. The OH groups are those that can react with isocyanates. These can be primary, secondary, or tertiary OH groups, but primary or secondary OH groups are preferred. Examples of suitable polyols are those based on polyethers, on polyalkylenes, or on polyesters.

Polyether polyols, constituting reaction products of low-molecular-weight polyfunctional alcohols with alkylene oxides, are particularly suitable. The alkylene oxides preferably have two to four carbon atoms. The reaction products of ethylene glycol, propylene glycol, the isomeric butanediols, hexanediols, or 4,4'-dihydroxydiphenylpropane with ethylene oxide, propylene oxide, butylene oxide, or mixtures of two or more thereof are, for example, suitable. Also suitable are the reaction products of polyfunctional alcohols such as glycerol, trimethylolethane or trimethylolpropane, pentaerythritol, or sugar alcohols with the aforesaid alkylene oxides to yield polyether polyols. Further polyols that are suitable in the context of the invention are produced by polymerization of tetrahydrofuran (poly-THF). The polyether polyols are manufactured in a manner known to one skilled in the art, and are commercially obtainable.

Among the aforementioned polyether polyols, the reaction products of low-molecular-weight alcohols with propylene oxide, under conditions in which secondary hydroxyl groups form in part, are particularly suitable.

Polyester polyols are furthermore suitable. Polyester polyols of this kind preferably encompass the reaction products of polyfunctional, by preference difunctional alcohols, optionally together with small quantities of trifunctional alcohols, and polyfunctional, by preference difunctional and/or trifunctional carboxylic acids. Instead of free polycarboxylic acids, the corresponding polycarboxylic acid anhydrides or corresponding polycarboxylic acid esters with alcohols having by preference one to three carbon atoms can be used. Hexanediol, butanediol, propanediol, ethylene glycol, 1,4-hydroxymethylcyclohexane, 2-methyl-1,3-propanediol, triethylene glycol, tetraethylene glycol, ethylene glycol, polyethylene glycol, dipropylene glycol, polypropylene glycol, dibutylene glycol, and mixtures of different alcohols are particularly suitable for manufacturing polyester polyols of this kind.

The polycarboxylic acids can be aliphatic, cycloaliphatic, aromatic or heterocyclic or both. They can optionally be substituted, for example with alkyl groups, alkenyl groups, ether groups, or halogens. Suitable polycarboxylic acids are, for example, succinic acid, adipic acid, suberic acid, azelaic acid, sebacic acid, phthalic acid, isophthalic acid, terephthalic acid, trimellitic acid, phthalic acid anhydride, tetrahydrophthalic acid anhydride, hexahydrophthalic acid anhydride, glutaric acid anhydride, maleic acid, maleic acid anhydride, fumaric acid, dimer fatty acid or trimer fatty acid, or mixtures of two or more thereof. Citric acid or trimellitic acid are preferably suitable as tricarboxylic acids. The aforesaid acids can be used individually or as mixtures of two or more thereof. Such OH-functional polyesters are known to one skilled in the art and are commercially obtainable. Polyester polyols containing two or three terminal OH groups are particularly suitable.

Polyester polyols of oleochemical origin can also be used, however. Such polyester polyols can be manufactured, for example, by complete ring opening of epoxidized triglycerides of an at least partly olefinically unsaturated fatty-acid-containing fat mixture with one or more alcohols having one to 12 carbon atoms, and subsequent partial transesterification of the triglyceride derivatives to yield alkyl ester polyols having one to 12 carbon atoms in the alkyl residue. Examples thereof are also castor oil.

Polycarbonate polyols are additional suitable polyester polyols. Polycarbonates can be obtained, for example, by the reaction of diols, such as propylene glycol, butanediol-1,4 or hexanediol-1,6, diethylene glycol, triethylene glycol, or tetraethylene glycol, or mixtures of two or more thereof, with diaryl carbonates, for example diphenyl carbonate, or phosgene. A further group of polyols to be used according to the present invention are the polyesters based on ε-caprolactone. Polyester polyols that contain one or more urethane groups in the molecule chain are also suitable.

Polyether polyols and/or polyester polyols having a molecular weight from 200 to 5000 g/mol, by preference 400 to 4000 g/mol (number-average molecular weight, measured by GPC) are, for example, suitable. Preferred polyols are intended to comprise two or three OH groups in the molecule; diols are particularly suitable.

Further suitable polyols are, for example, alkylene polyols having two to six OH groups per molecule. Alcohols having primary and secondary OH groups are preferably suitable. Included among the suitable aliphatic alcohols are, for example, diols such as ethylene glycol, propylene glycol, 1,4-butanediol, 1,5-pentanediol, 1,6-hexanediol, 1,7-heptanediol, 1,8-octanediol, 1,10-decanediol, 1,12-dodecanediol, dimer fatty alcohol, and higher homologs or isomers thereof. Also suitable are higher-functional alcohols such as, for example, glycerol, trimethylolethane, pentaerythritol, and/or trimethylolpropane, or higher-functional alcohols such as, for example, pentaerythritol. These can be contained at least in portions. Suitable aliphatic alcohols have a molecular weight from 60 to 400 g/mol. Linear alcohols having two to 30 carbon atoms that comprise two to four OH groups are, however, used in particular.

The polyols can be used individually or in a mixture. Mixed polyurethane prepolymers can also form.

Monomeric isocyanates "suitable" for the present invention are understood to be those having two or three NCO groups in the molecule. These are preferably the known aliphatic, cycloaliphatic, or aromatic monomeric isocyanates.

Suitable isocyanates that can be used are those having a molecular weight from 160 to 500 g/mol. These are selected, for example, from the group of 1,5-naphthylene diisocyanate, 4,4'-diphenylmethane diisocyanate (MDI), hydrogenated or partly hydrogenated MDI (H12 MDI, H6MDI), xylylene diisocyanate (XDI), tetramethylxylylene diisocyanate (TMXDI), 4,4'-diphenyldimethylmethane diisocyanate, di- and tetraalkylenediphenylmethane diisocyanate, 4,4'-dibenzyl diisocyanate, 1,3-phenylene diisocyanate, 1,4-phenylene diisocyanate, the isomers of toluoylene diisocyanate (TDI), 1-methyl-2,4-diisocyanatocyclohexane, 1,6-diisocyanato-2,2,4-trimethylhexane, 1,6-diisocyanato-2,4,4-trimethylhexane, chlorinated and brominated diisocyanates, phosphorus-containing diisocyanates, tetramethoxybutane-1,4-diisocyanate, naphthalene-1,5-diisocyanate (NDI), butane-1,4-diisocyanate, hexane-1,6-diisocyanate (HDI), dicyclohexylmethane diisocyanate, tetramethylene, hexamethylene, undecane, dodecamethylene, and 2,2,4-trimethylhexane-2,3,3-trimethylhexamethylene diisocyanate, cyclohexane-1,4-diisocyanate, ethylene diisocyanate, methylenetriphenyltriisocyanate (MIT), phthalic acid bis-isocyanatoethyl ester, diisocyanates having reactive halogen atoms, such as 1-chloromethylphenyl-2,4-diisocyanate, 1-bromomethylphenyl-2,6-diisocyanate, 3,3-bis-chloromethyl ether-4,4'-diphenyl diisocyanate. Further usable diisocyanates are trimethylhexamethylene diisocyanate, 1,4-diisocyanatobutane, 1,12-diisocyanatododecane, and dimer fatty acid diisocyanate, lysine diisocyanate, 4,4-dicyclohexylmethane diisocyanate, 1,3-cyclohexane diisocyanate or 1,4-cyclohexane diisocyanate.

Suitable diisocyanates having two NCO groups of differing reactivity are selected from the group of the aromatic, aliphatic, or cycloaliphatic diisocyanates. Examples of particularly suitable diisocyanates having differently reactive NCO groups are the isomers of toluoylene diisocyanate (TDI), naphthalene-1,4-diisocyanate, 1,3-phenylene diisocyanate, or 2,4'-diphentylmethane diisocyanate (2,4'-MDI), 1,6-diisocyanato-2,2,4-trimethylhexane, 1,6-diisocyanato-2,4,4,-trimethylhexane, and lysine diisocyanate, 1-isocyanatomethyl-3-isocyanato-1,5,5-trimethylcyclohexane (isophorone diisocyanate, IPDI), 1-methyl-2,4-diisocyanatocyclohexane, or 1,4-diisocyanato-2,2,6-trimethylcyclohexane (TMCDI).

Suitable trifunctional isocyanates are those isocyanates that are produced by trimerization or oligomerization of diisocyanates or by reacting diisocyanates with trifunctional hydroxyl-group-containing compounds, for example having a molecular weight below 500 g/mol. Examples thereof are trimerization products of the isocyanates HDI, MDI, or IPDI.

The prepolymers suitable according to the present invention are manufactured from the above-mentioned polyols and polyisocyanates using known methods, the isocyanates being reacted at a stoichiometric excess with the polyols. Particularly suitable prepolymers having a favorable molar mass distribution can be obtained at an NCH:OH ratio from 4:1 to 10:1. The reaction can occur, for example, at room temperature; elevated temperatures can also be utilized. The starting compounds generally react spontaneously with one another, but it may also be necessary to add catalysts, such as organometallic compounds or organic amino compounds. The known methods can furthermore be used to remove unreacted monomeric polyisocyanates. This can be done, for example, by precipitating or capturing the monomeric isocyanates. A preferred embodiment removes the unreacted monomers by distilling off the monomers under vacuum, for example in a thin-film evaporator.

In another preferred embodiment, asymmetrical diisocyanates are used to manufacture the prepolymers. It is thereby possible to utilize the selective reaction of the monomeric asymmetrical diisocyanates with the diols, so that under suitable stoichiometric conditions and with suitable reaction management, the reaction product contains only a small proportion of monomeric, low-molecular-weight diisocyanates.

The low-monomer prepolymers usable according to the present invention are intended to have a concentration of monomeric, unreacted polyisocyanates below 1 wt % (based on the prepolymer), in particular less than 0.1 wt %. The prepolymers have a molecular weight from 300 to 6000 g/mol, by preference less than 4000, in particular less than 2000 g/mol. The number of NCO groups per molecule is 3 or in particular 2; in particular, exclusively reactive aromatic diisocyanates are reacted. The quantity of prepolymers is intended to be from 30 to 70 wt % (based on the adhesive).

According to the present invention, the melt adhesive is intended to contain at least one thermoplastic polyester. The molecular weight of the thermoplastic polyester is intended to be less than 6000 g/mol. According to the present invention, the polyesters must have only a low functionality and are to contain only a small number of groups reactive with isocyanates. The quantity is selected so that no double-ended chain elongation of the prepolymers occurs. On average, less than 1.4 groups reactive with NCO groups are to be contained in each polymer chain, preferably less than 1, and in particular they are intended to be substantially free of NCO-reactive groups.

Appropriate polyesters are the known polyesters based on reaction products of polyfunctional, by preference difunctional alcohols, optionally together with small quantities of trifunctional alcohols, and polyfunctional, by preference difunctional and/or trifunctional carboxylic acids. Instead of free polycarboxylic acids, the corresponding polycarboxylic acid anhydrides, or corresponding polycarboxylic acid esters with alcohols having by preference 1 to 3 carbon atoms, can also be used. The polyesters known per se can be used. Polyesters based on aliphatic dicarboxylic acids are particularly suitable.

The functionality of the thermoplastic polyesters is intended to be decreased. This can be achieved by a variety of actions. For example, the number of OH— or COOH-containing terminal groups can be decreased already during synthesis, by adding monovalent alcohols. Another procedure reduces the number of functional groups of the polyesters by polymer-analogous reactions with low-molecular-weight monofunctional compounds, for example below 500 g/mol.

For example, it is possible to decrease OH groups or COOH groups by reacting with carboxylic acid halides. The reaction can be achieved easily thanks to the high reactivity of such derivatives. In another procedure functional groups that are present are reacted with esters or orthoesters. By removing the volatile reaction products, a reaction can be assisted and the number of reactive groups can be decreased. In a further suitable procedure, functional groups that are present are reacted with carboxylic acid anhydrides. It is optionally also possible to add portions of solvents in order to facilitate the reaction. These can then be removed again, optionally together with byproducts, by distillation under vacuum.

In a preferred embodiment, OH groups or COOH groups that are present are reacted with monovalent isocyanates. Monoisocyanates, such as phenyl isocyanate, tosyl isocyanate, or stearyl isocyanate, are particularly suitable. These can be added in quantities as high as equimolar (based on the OH groups of the thermoplastic polyesters), for example with an NCO:OH ratio from approximately 0.3:1 to 1.02:1, in particular up to 0.98:1, and react with the thermoplastic polyesters to form urethane groups. An excess of such monomeric isocyanates is to be avoided. The quantity of groups reactive with NCO can be reduced by way of the reaction.

The quantity of thermoplastic polyesters is intended to be more than 30 up to 70 wt % (based on the adhesive). The polyesters are preferably ones based on crystalline or semicrystalline polyester diols whose functionality has been decreased. A particular embodiment utilizes those linear polyesters that also comprise urethane groups. For example, suitable thermoplastic polyesters can contain a urethane group or, in particular, two urethane groups. The viscosity of the melt adhesive can be influenced by way of the quantity and selection of the thermoplastic polyesters.

The moisture-curing melt adhesives according to the present invention can additionally contain additives. Examples thereof are tackifying resins, adhesion-promoting additives, fillers, pigments, plasticizers, stabilizers and/or catalysts, waxes, or mixtures thereof with further usual adjuvants and additives.

Abietic acid, abietic acid esters, terpene resins, terpene phenol resins, phenol-modified styrene polymers, phenol-modified α-methylstyrene polymers, or hydrocarbon resins can be utilized, for example, as tackifying resins. The known organometallic and/or amine-type catalysts are suitable as catalysts in quantities up to 2%, for example the organometallic compounds of tin, of iron, of titanium, or of bismuth, such as tin(II) salts of carboxylic acids or the dialkyltin(IV) carboxylates. Antioxidants, such as the commercially usual sterically hindered phenols and/or thioethers and/or substituted benzotriazoles, or the sterically hindered amines of the HALS type, serve e.g. as stabilizers. In special compositions, plasticizers can in particular also be used. These are nonreactive plasticizers, for example naphthenic mineral oils, polypropylene oligomers, polybutene oligomers, polyisobutylene oligomers, polyisoprene oligomers, hydrogenated polyisoprene oligomers and/or polybutadiene oligomers, benzoate esters, phthalates, adipates, or hydrocarbon oils. Typical adhesion promoters are, for example, ethylene/acrylamide comonomers, polymeric isocyanates, reactive organosilicon compounds, or phosphorus derivatives; in particular, silanes that contain hydrolyzable groups are also suitable. Pigments and fillers can likewise be contained in small quantities. Waxes can be of natural origin, optionally also in chemically modified form, or of synthetic origin. All natural waxes (vegetable waxes, animal waxes) can be used; mineral waxes or petrochemical waxes are also suitable.

A further embodiment of the invention can also contain, as additives, portions of other polymers without further functional groups. These can be synthetic polymers that influence properties which are important for melt adhesives, such as adhesion, strength, and temperature behavior. Such polymers can be, for example, polycondensates such as (co)polyamides, polyamide/EVA copolymers, polyether amides, polyether ester amides; polymerizates such as polyvinylpyrrolidone, polyethyloxazoline, polyvinyl methyl ether, or ethylene copolymers, ethylene/vinyl acetate copolymers, ethylene/acetate copolymers, propylene copolymers, or (meth) acrylate copolymers. Polymers from the group of the poly (meth)acrylates and copolymers thereof are particularly suitable. These are, for example, copolymers of ethylenically unsaturated compounds, such as C1 to C18 alkyl esters of (meth)acrylic acid, (meth)acrylic acid, esters of (meth)acrylic acid with 90 glycol ethers, such as methoxyethanol and/or ethoxyethanol, vinyl esters such as vinyl acetate, vinyl propionate, vinyl esters of branched monocarboxylic acids. Such (meth)acrylates are intended in particular to have an average molecular weight ($M_N$) below 60,000 g/mol, in particular from 10,000 to 40,000 g/mol. Further polymers of this kind can be contained in quantities from 0 to 20 wt %, in particular from 5 to 15 wt %. In total, less than 30 wt % additives are to be contained in the adhesive.

A melt adhesive according to the present invention contains, in particular, 30 to less than 70 wt % of at least one low-monomer prepolymer having a molecular weight ($M_N$) below 6000 g/mol, as a reaction product of polyether diols, polyalkylene diols, and/or polyester diols and an excess of aromatic diisocyanates, more than 30 up to 70 wt % of at least one thermoplastic polyester having a molecular weight ($M_N$)

below 6000 g/mol that comprises less than 1.4 NCO-reactive groups, as well as up to 30 wt % additives. The sum of the constituents is intended to equal 100 wt %.

A melt adhesive according to the present invention is notable for a favorable viscosity, which is equal to 4000 mPas to 40,000 mPas measured at a temperature between 90° C. and 130° C. (measured per EN ISO 2555, Brookfield viscosimeter). The viscosity measured at a temperature between 90 and 120° C. is intended in particular to be from 4000 to 30,000 mPas. A melt adhesive according to the present invention is intended to contain 0.25 to 4 wt % NCO groups.

By way of the selection of the thermoplastic polyesters having few reactive groups, it is possible to ensure that the adhesive according to the present invention exhibits a correspondingly low viscosity. Selection of the polyester further makes possible a low melting point, so that a suitable application viscosity can be obtained even at low temperatures. Despite the low concentration of monomeric diisocyanates, a melt adhesive according to the present invention still exhibits a low, suitable melt viscosity.

The melt adhesive according to the present invention is suitable for adhesive bonding of a variety of substrates. In particular, the low application viscosity makes it possible to adhesively bond even substrates that are temperature-sensitive. Bonding of, for example, sensitive films, plastic, paper, and similar substrates is possible. An adhesive according to the present invention can be applied at low temperatures of, for example, less than 150° C., in particular also from 90 to 130° C. The viscosity enables good flow onto the substrate. The adhesive then cools, becomes solid, and crystallizes. Adhesion to the substrate quickly becomes established, and the adhesively bonded substrate can quickly be further processed. Because adhesives, remain in the reservoir tank in the molten state for a long period of time in the context of usual processing, it is advantageous for the viscosity to remain constant in that context, and for the adhesive to continue to be easily processable.

The melt adhesive according to the present invention exhibits, after cooling, a rapid buildup of adhesion in the adhesive layer, in which context the adhesive crystallizes. Substrates bonded with a melt adhesive can therefore quickly be further processed, and the final chemical crosslinking reaction under the influence of moisture can occur later. The final hardness and cohesion of the adhesive according to the present invention then becomes established.

The invention will now be explained by way of examples.

EXAMPLE 1 (COMPARISON)

In a heated agitator vessel, a reactive melt adhesive composition having free isocyanate groups was manufactured from the following constituents:

| | |
|---|---|
| Polyester 1 | 40 parts |
| (from adipic acid and hexanediol-1,6; OH no. 30) | |
| Hydrocarbon resin ($M_N$ < 1000) | 10.0 |
| Low-monomer prepolymer | 50.0 |
| (made up of PPG 750 and 4,4-MDI; NCO content: 5.9%, monomer content <0.1% after demonomerization. Reaction of the isocyanate groups with the hydroxyl groups occurs at 130° C.) | |

The constituents are mixed while hot, with moisture excluded. The adhesive can then be decanted into moisture-tight sealable containers and used later.
NCO content: 2.1%

EXAMPLE 2 (ACCORDING TO THE PRESENT INVENTION)

Analogously to Example 1, the following were reacted:

| | |
|---|---|
| Polyester 1 | 40 parts |
| (reacted in a pre-reaction with stearyl isocyanate at an NCO:OH ratio of 0.95:1; reaction of the isocyanate groups with the hydroxyl groups occurs at 130° C.) | |
| Hydrocarbon resin ($M_N$ <1000) | 10.0 |
| Low-monomer prepolymer | 50.0 |

After mixing of the constituents, the adhesive can be decanted into moisture-tight sealable containers and stored.
NCO content: 2.95%

| | Viscosity, 90° C. | Viscosity after holding (8 h, 90° C.) | Open time |
|---|---|---|---|
| Experiment 1 | 25,500 mPas | 38,200 mPas | 500 sec |
| Experiment 2 | 2100 mPas | 2400 mPas | 120 sec |

The adhesive according to the present invention has a lower viscosity, which is stable even after thermal stress.

Adhesive bonding experiments indicated quicker crystallization and a shorter open time for the applied adhesive film.
Test Methods for Determining the "Open Time" Parameter A heated cartridge gun (130° C.) was used to apply a hot-melt bead 3 mm thick onto a plywood panel.

Beechwood spatulas were pressed successively, at defined time intervals, into the hot bead and each briefly pushed in with a defined weight (500 g).

The spatulas were then pulled off the plywood panel. The time at which no further chip tear-out is visible on the beechwood spatula is noted as the "open time."

What is claimed is:

1. A reactive melt adhesive, containing
   30 to 50 wt % of at least one prepolymer having at least two isocyanate groups having a molecular weight below 6000 g/mol, manufactured from polyether polyols and/or polyester polyols reacted with a molar excess of diisocyanates, the prepolymer containing less than 1% monomeric diisocyanate,
   more than 30 up to 70 wt % of a thermoplastic polyester having a number-average molecular weight ($M_N$) below 6000 g/mol, which comprises fewer than 1.4 groups reactive with NCO, and
   optionally up to 30 wt % additives from one or more of catalysts, resins, plasticizers, fillers, pigments, stabilizers, further polymers, or adhesion promoters.

2. The melt adhesive according to claim 1, wherein the viscosity, measured at a temperature between 90° C. and 130° C., is from 4000 mPas to 40,000 mPas (EN ISO 2555).

3. The melt adhesive according to claim 1, wherein aromatic diisocyanates are used as diisocyanates to manufacture the prepolymer.

4. The melt adhesive according to claim 1, wherein polyether diols are used as polyols to manufacture the prepolymer.

5. The melt adhesive according to claim 1, wherein the thermoplastic polyester is a reaction product of polyester diols and low-molecular-weight monofunctional compounds selected from carboxylic acid halides, carboxylic acid anhydrides, or monovalent isocyanates.

6. The melt adhesive according to claim 1, wherein the thermoplastic polyester has substantially no groups reactive with NCO.

7. The melt adhesive according to claim 1, wherein the thermoplastic polyester is prepared from aliphatic dicarboxylic acids.

8. The melt adhesive according to claim 1, wherein the thermoplastic polyester comprises on average one to two urethane groups.

9. The melt adhesive according to claim 1, wherein a mixture of polyether prepolymers and thermoplastic polyesters is used.

10. A reactive melt adhesive, containing
- 30 to less than 70 wt % of at least one prepolymer having at least two isocyanate groups having a molecular weight below 6000 g/mol, manufactured from polyether polyols and/or polyester polyols reacted with a molar excess of diisocyanates, the prepolymer containing less than 1% monomeric diisocyanate,
- 40 to 70 wt % of a thermoplastic polyester having a number-average molecular weight ($M_N$) below 6000 g/mol, which comprises fewer than 1.4 groups reactive with NCO, and
- optionally up to 30 wt % additives from one or more of catalysts, resins, plasticizers, fillers, pigments, stabilizers, further polymers, or adhesion promoters.

11. A reactive melt adhesive consisting of:
- 30 to 50% of at least one prepolymer having at least two isocyanate groups having a molecular weight below 6000 g/mol, manufactured from polyether polyols and/or polyester polyols reacted with a molar excess of diisocyanates, the prepolymer containing less than 1% monomeric diisocyanate;
- 40 to 70 wt % of a thermoplastic polyester having a number-average molecular weight ($M_N$) below 6000 g/mol, which comprises fewer than 1.4 groups reactive with NCO, and
- optionally up to 30 wt % additives from one or more of catalysts, resins, fillers, pigments, stabilizers, further polymers, or adhesion promoters, wherein the reactive hot melt adhesive contains no plasticizers.

12. The melt adhesive according to claim 10, wherein the viscosity, measured at a temperature between 90° C. and 130° C., is from 4000 mPas to 40,000 mPas (EN ISO 2555).

13. The melt adhesive according to claim 10, wherein aromatic diisocyanates are used as diisocyanates to manufacture the prepolymer.

14. The melt adhesive according to claim 10, wherein polyether diols are used as polyols to manufacture the prepolymer.

15. The melt adhesive according to claim 10, wherein the thermoplastic polyester is a reaction product of polyester diols and low-molecular-weight monofunctional compounds selected from carboxylic acid halides, carboxylic acid anhydrides, or monovalent isocyanates.

16. The melt adhesive according to claim 10, wherein the thermoplastic polyester has substantially no groups reactive with NCO.

17. The melt adhesive according to claim 10, wherein the thermoplastic polyester is prepared from aliphatic dicarboxylic acids.

18. The melt adhesive according to claim 10, wherein the thermoplastic polyester comprises on average one to two urethane groups.

19. The melt adhesive according to claim 10, wherein a mixture of polyether prepolymers and thermoplastic polyesters is used.

* * * * *